W. R. NASH.
Churn Dasher.
No. 7,348. Patented May 7, 1850.
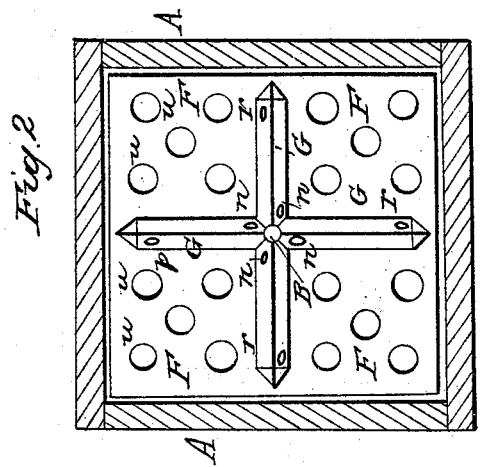
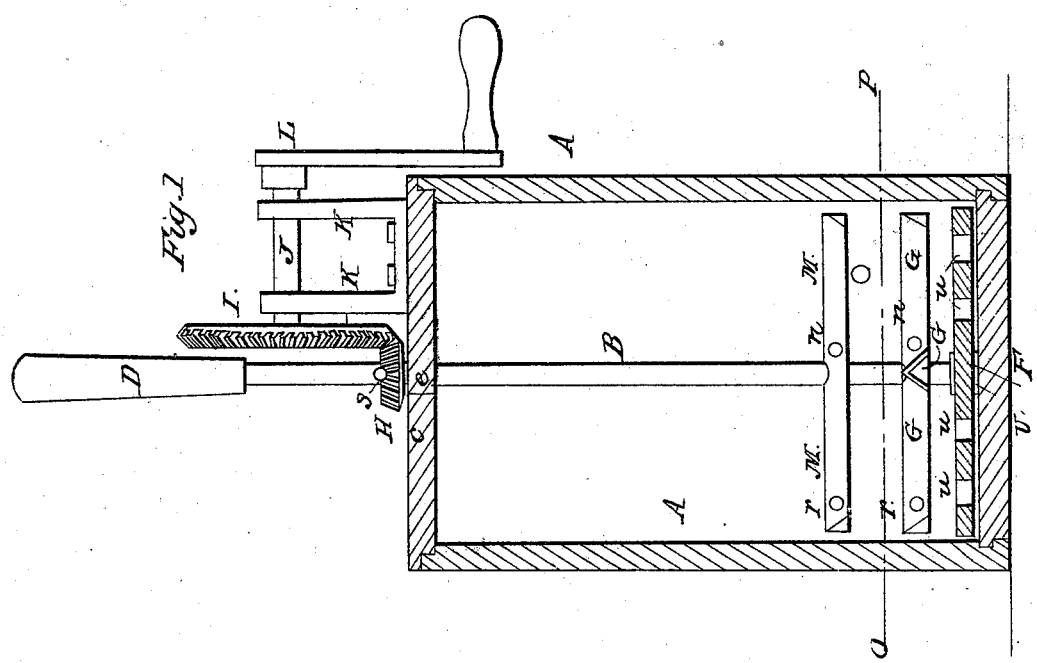

UNITED STATES PATENT OFFICE.

WILLIAM R. NASH, OF BRIDGEPORT, CONNECTICUT.

WORKING ROTARY AND VERTICAL CHURN-DASHERS.

Specification of Letters Patent No. 7,348, dated May 7, 1850.

*To all whom it may concern:*

Be it known that I, WILLIAM R. NASH, of Bridgeport, in the county of Fairfield and State of Connecticut, have invented a new and useful Improvement in Churns; and I do hereby declare that the following is a full and exact description of the construction and operation of the same, reference being had to the annexed drawings making a part of this specification, in which—

Figure 1 is a vertical section, and Fig. 2 is a horizontal section on the line O P.

The nature of this invention consists, principally in so arranging and combining in the same churn and upon one shaft, a horizontal rotary dasher and a vertically vibrating dasher, that while the rotary dasher is operated for the purpose of agitating the cream, the vibrating dasher remains at rest; and that when the butter is produced, the vibrating dasher may be operated for the purpose of gathering or consolidating the butter, and that without changing the connection of the machinery, and while the rotary gear remains at rest.

The body of the churn A A is a parallelogram, in the center of which is a vertical shaft B, surmounted by a vertical handle D. The lower end of the shaft passes through the center of the vibrating dasher F, and has its lower bearing in the center of the bottom of the churn, as indicated by dotted lines at $v$, and is supported in its vertical position by its upper bearing, at the center of the lid $c\ e$. The shaft revolves freely within the central aperture of the vibrating dasher, but has a flange or collar immediately above, and another below the dasher, which prevents it from sliding longitudinally through it, and whereby the dasher is occasionally made to vibrate vertically. An inch or more above the vibrating dasher, is a rotary dasher G G, attached to the shaft. This dasher consists of four radial hollow prismatic arms, each of which is perforated with one or more holes $n$ in its forward side, near the shaft; and has one or more apertures $r$ in its rearward side, at or near the outward end thereof. These apertures are for the purpose of allowing atmospheric air (which usually accumulates at the center) to pass through the arms, outward. Immediately above the lid, the shaft passes through a pinion H, which rests upon the lid, and is driven by a gear wheel I, which is mounted upon a horizontal shaft J, supported by two posts K K; and to the outward end of this shaft is attached a crank L. In and across the top of the pinion H is a notch or groove, through which passes a horizontal pin $s$, which also passes through the vertical shaft; so that when the pinion is made to revolve, the shaft and rotary dasher are also put in motion rotarily; but the shaft being free to slide vertically upward, the pin $s$ does not prevent a vibratory motion of the shaft and vibrating dasher, which motion is occasionally produced by means of the handle D. The lid is made in two parts, being divided between $c$ and $e$, so that the section $c$ may be occasionally removed, without disturbing the section $e$. The vibrating dasher is perforated vertically with several apertures $u\ u$, as represented in the drawings. One or more additional rotary dashers, may be attached to the vertical shaft, represented, and designated by M M Fig. 1.

I claim—

The application of the shaft B to communicate a vertical reciprocating movement to the dasher F and a rotary one to the dashers M and G so that either can be used as described as herein set forth.

WILLIAM R. NASH.

Witnesses:
W. H. GODDARD,
G. B. WOODRUFF.